UNITED STATES PATENT OFFICE.

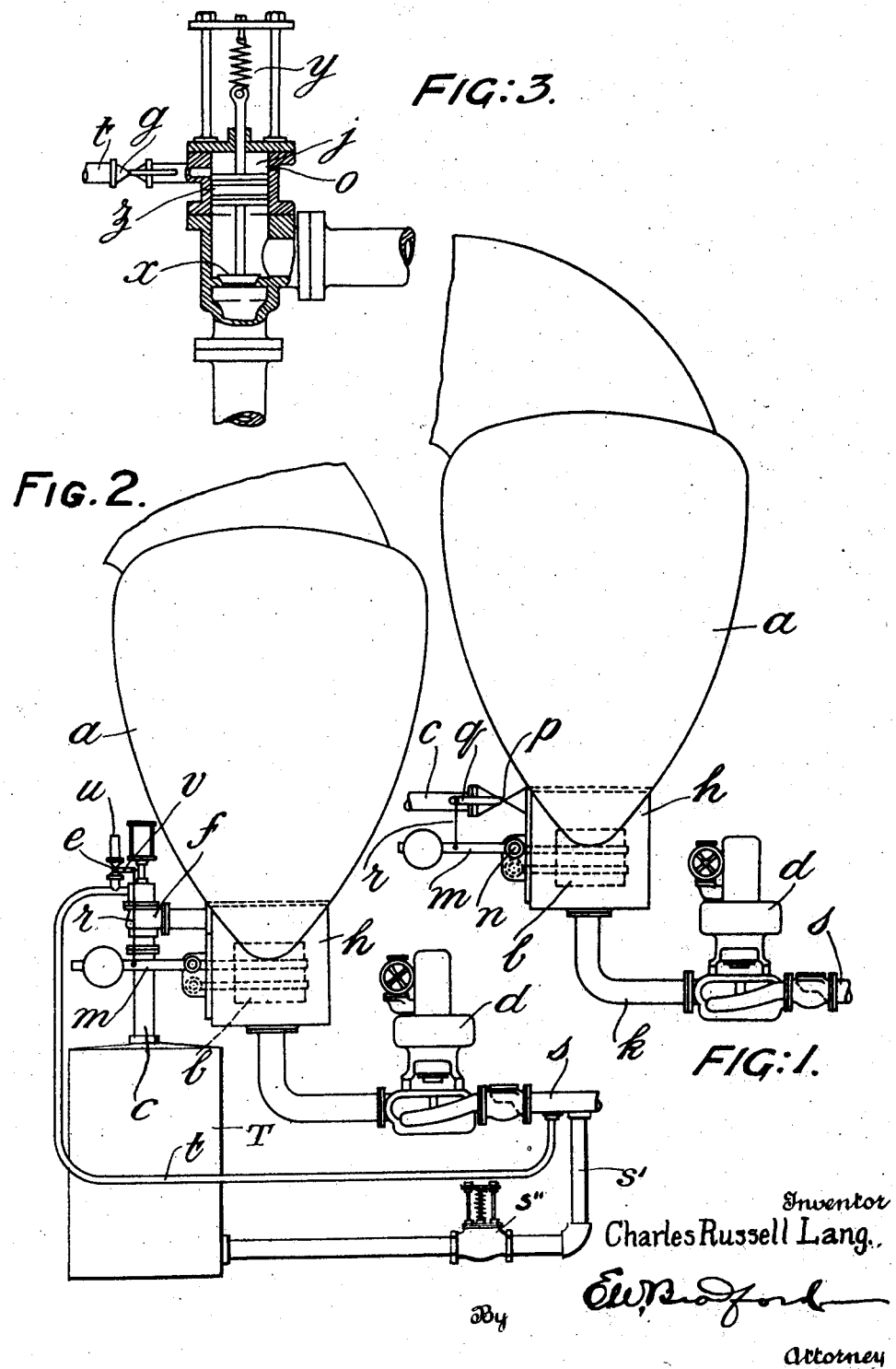

CHARLES RUSSELL LANG, OF GLASGOW, SCOTLAND, ASSIGNOR TO G. & J. WEIR, LIMITED, OF GLASGOW, SCOTLAND.

FEED-WATER SYSTEM FOR STEAMSHIPS.

1,392,341.   Specification of Letters Patent.   Patented Oct. 4, 1921.

Application filed July 17, 1919. Serial No. 311,587.

*To all whom it may concern:*

Be it known that I, CHARLES RUSSELL LANG, a subject of the King of Great Britain and Ireland, residing at Cathcart, Glasgow, Scotland, have invented certain new and useful Improvements in Feed-Water Systems for Steamships; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a feed water system for steamships of the nature of that described in the specification of application for Patent No. 1302256. In this feed water system the water of condensation is withdrawn from the main condenser by a water-extraction pump which delivers the water along the main feed conduit and ultimately to the suction of the boiler feed pump; and provision is made for passing feed water from the main feed conduit into a feed tank (or feed tanks) and for returning it (when necessary) from this feed tank (or one or other of the feed tanks) to the main condenser or to the suction of the water-extraction pump, this return flow being controlled by an automatic valve on the return conduit. This automatic valve is controlled by the pressure of water in the main feed conduit so that the opening of the valve is regulated by the said pressure.

The present invention—which will be described in the following specification and more particularly defined in the annexed claims—relates to a feed water system as above mentioned and has special reference to the control of the automatic valve on the return feed conduit with the object of allowing the main feed supplied by the condenser to be supplemented when necessary by return feed passed along the return conduit.

The mechanism of the float control device may, according to the present invention, be directly connected to the valve so as to actuate the valve as aforesaid; or alternatively the mechanism may be arranged to operate the valve through a relay.

In the accompanying drawings, which illustrate diagrammatically three methods of carrying out this invention:—

Figure 1 shows a general arrangement according to one method,

Fig. 2 shows a general arrangement according to another method, and

Fig. 3 is a section through the valve illustrated in Fig. 2, but provided with a leakage opening to illustrate the third method of carrying out the invention.

Like reference-letters indicate like parts throughout the drawings.

The condenser $a$, Fig. 1, has at the bottom a collecting chamber $h$ for the water of condensation wherein a float $b$ operates. The float has secured to it a lever $m$ which is pivoted at $n$. A conduit $c$ connected at one end to the feed-tank, not shown in Fig. 1, communicates at the other end with the condenser through a valve $p$. The operating-arm $q$ of this valve is connected by a link $r$ with the arm $m$ of the float $b$, and the valve is arranged so that, when the float drops, the arm $q$ will be pushed up to open the valve.

The pump $d$ extracts the water from the chamber $h$ by means of a conduit $k$ and feeds it forward through the main feed conduit $s$ to the boiler-feed pumps.

It will be seen that the arrangement shown in Fig. 1 is simple to construct, and has few parts to get out of order. If the water in the chamber $h$ falls so low that the pump $d$ is likely to be insufficiently supplied with water, the float $b$, falling with the water, opens the valve $p$; and thus the water of condensation is supplemented by feed water supplied by the supplementary feed-conduit $c$.

In the arrangement shown in Fig. 2 the float operates a relay-valve. The float-arm $m$, instead of being directly connected to the valve controlling the supplementary feed-conduit, is connected to a relay-valve $e$ situated on an escape-conduit $u$ which communicates with the conduit $t$. The arm $m$ of the float is connected by a link $r$ to the arm *v* of the valve *e*, and the arrangement is such that, when the float falls, the valve *e* opens the escape-conduit.

The valve *f* is of known construction and is shown in Fig. 3. The movable valve member *x* tends to be raised from its seating by a spring *y* which is in tension, but it carries a piston *z* operating in a pressure-chamber *j*, and, when this pressure-chamber is filled with water under pressure, the piston holds the movable member *x* of the valve firmly down upon its seating. A tank T is connected to the main conduit *s* by a by-pass *s'* with an automatic non-return valve *s''* and at the other end by a conduit *e'* to the condenser.

The operation of this arrangement of apparatus is as follows:—The pressure in the delivery-conduit *s* of the pump *d* is normally communicated through the conduit *t* to the pressure-chamber *j* of the valve *f*, the valve *e* at such times maintaining the escape-conduit closed. As, however, the level of the water in the float-chamber *h* falls, the float *b* falls and opens the valve *e*, so that the pressure in the conduit *t* and consequently in the chamber *j* is reduced, and the valve *f* opens and admits water from the supplementary conduit *c* to the float-chamber.

If desired, instead of the valve *e* opening the escape-conduit, a valve *g*, Fig. 3, may be subtsituted, which valve is arranged to open the conduit *t* to the pressure-chamber *j* in one of its positions, and cut off this communication in its other position. In such case the pressure-chamber is provided with a leakage-hole *o* from which water can at all times escape. When the valve *g* is opened by reason of the float being raised, the piston *z* keeps the valve *x* firmly down upon its seating because the leakage opening is so small as not to sufficiently reduce the pressure to allow the spring *y* to raise the valve *x*. But, when the float falls and closes the valve *g*, the leakage through the leakage hole *o* quickly reduces the pressure in the chamber *j*, and thus the valve-element *x* can rise from its seating, and supplementary feed-water can pass to the condenser.

Having thus described my invention, what I claim as new and desire to secure by Letters Patent is:—

1. In a feed water system employing a feed tank for steam-ships the combination with a condenser, a main feed conduit, a water-extraction pump for withdrawing the water of condensation from the said condenser and delivering it into the said main feed conduit, a feed-tank, a by-pass connecting the said main feed conduit with the feed tank, a supplementary feed conduit connecting the said feed tank with the said condenser and an automatic valve on the said supplementary feed conduit, of a collecting chamber for receiving the water of condensation from the condenser, a float in the said chamber, and means whereby the said float controls the opening of the said automatic valve according to the water level in the said chamber.

2. In a feed water system employing a feed tank for steam-ships the combination with a condenser, a main feed conduit, a water-extraction pump for withdrawing the water of condensation from the said condenser and delivering it into the said main feed conduit, a feed-tank, a by-pass connecting the said main feed conduit with the feed tank, a supplementary feed conduit connecting the said feed tank with the said condenser and an automatic valve on the said supplementary feed conduit, of a pressure chamber in the said automatic valve serving to control the opening of the valve, a pressure conduit connecting the said pressure chamber with the said main feed conduit, a collecting chamber for receiving the water of condensation from the said condenser, a float in the said water collecting chamber, and means whereby the said float controls the pressure in the said pressure chamber according to the water level in the said water collecting chamber.

3. In a feed water system employing a feed tank for steam-ships the combination with a condenser, a main feed conduit, a water-extraction pump for withdrawing the water of condensation from the said condenser and delivering it into the said main feed conduit, a feed-tank, a by-pass connecting the said main feed conduit with the feed tank, a supplementary feed conduit connecting the said feed tank with the said condenser and an automatic valve on the said supplementary feed conduit, of a pressure chamber in the said automatic valve serving to control the opening of the valve, a pressure conduit connecting the said pressure chamber with the said main feed conduit, a collecting chamber for receiving the water of condensation from the said condenser, a float in the said water collecting chamber, a relay valve for controlling the pressure in the said pressure chamber, and means whereby the said float controls the said relay valve according to the water level in the said water collecting chamber.

4. In a feed water system employing a feed tank for steam-ships the combination with a condenser, a main feed conduit, a water-extraction pump for withdrawing the water of condensation from the said condenser and delivering it into the said main feed conduit, a feed-tank, a by-pass connecting the said main feed conduit with the feed tank, a supplementary feed conduit connecting the said feed tank with the said condenser and an automatic valve on the said supplementary feed conduit, of a pressure chamber in the said automatic valve serving to control the opening of the valve, a pressure conduit connecting the said pressure chamber with the said main feed conduit, a collecting chamber for receiving the water of condensation from the said condenser, a float in the said water collecting chamber, an escape conduit connected with the said pressure conduit, and with the said pressure chamber, a relay valve on the said escape conduit, and means whereby the said float controls the said relay valve according to the water level in the said water collecting chamber.

I hereby sign my name to this specification.

CHARLES RUSSELL LANG.